United States Patent [19]
Douglas

[11] 3,882,518
[45] May 6, 1975

[54] PROCESSING SYSTEM FOR PHOTOGRAPHIC APPARATUS

[75] Inventor: Lawrence M. Douglas, South Easton, Mass.

[73] Assignee: Polaroid Corporation, Cambridge, Mass.

[22] Filed: Mar. 6, 1974

[21] Appl. No.: 448,448

[52] U.S. Cl. .............................. 354/301; 354/86
[51] Int. Cl. ........................................ G03d 9/00
[58] Field of Search ......... 354/84, 85, 86, 297, 301, 354/303, 307, 312, 319

[56] References Cited
UNITED STATES PATENTS

| | | | |
|---|---|---|---|
| 2,516,398 | 7/1950 | Land et al. | 354/304 X |
| 2,719,472 | 10/1955 | Land | 354/303 |
| 3,142,241 | 7/1964 | Limberger | 354/301 |
| 3,327,599 | 6/1967 | Murphy | 354/301 |
| 3,561,340 | 2/1971 | Erlichman | 354/86 X |
| 3,563,145 | 2/1971 | Bendoni et al. | 354/86 |

*Primary Examiner*—Fred L. Braun
*Attorney, Agent, or Firm*—Alfred E. Corrigan; Frank E. Caufield

[57] ABSTRACT

Apparatus for spreading processing fluid between a pair of sheet materials. A pair of elongated spreader elements are rotatably mounted between spaced apart integrated bearing and guide members. The guides serve to direct translational motion of the spreader elements with respect to each other. Springs urge the spreader elements toward one another. Manual adjustments are provided for differentially adjusting the spacing separating the spreader elements and/or the magnitude of the force caused by the springs. The assembly is adapted to be inserted and removed from a camera as an integral part thereof and is suitable for use in different self-developing photographic systems, particularly the type employing motors to drive the spreading apparatus.

19 Claims, 6 Drawing Figures

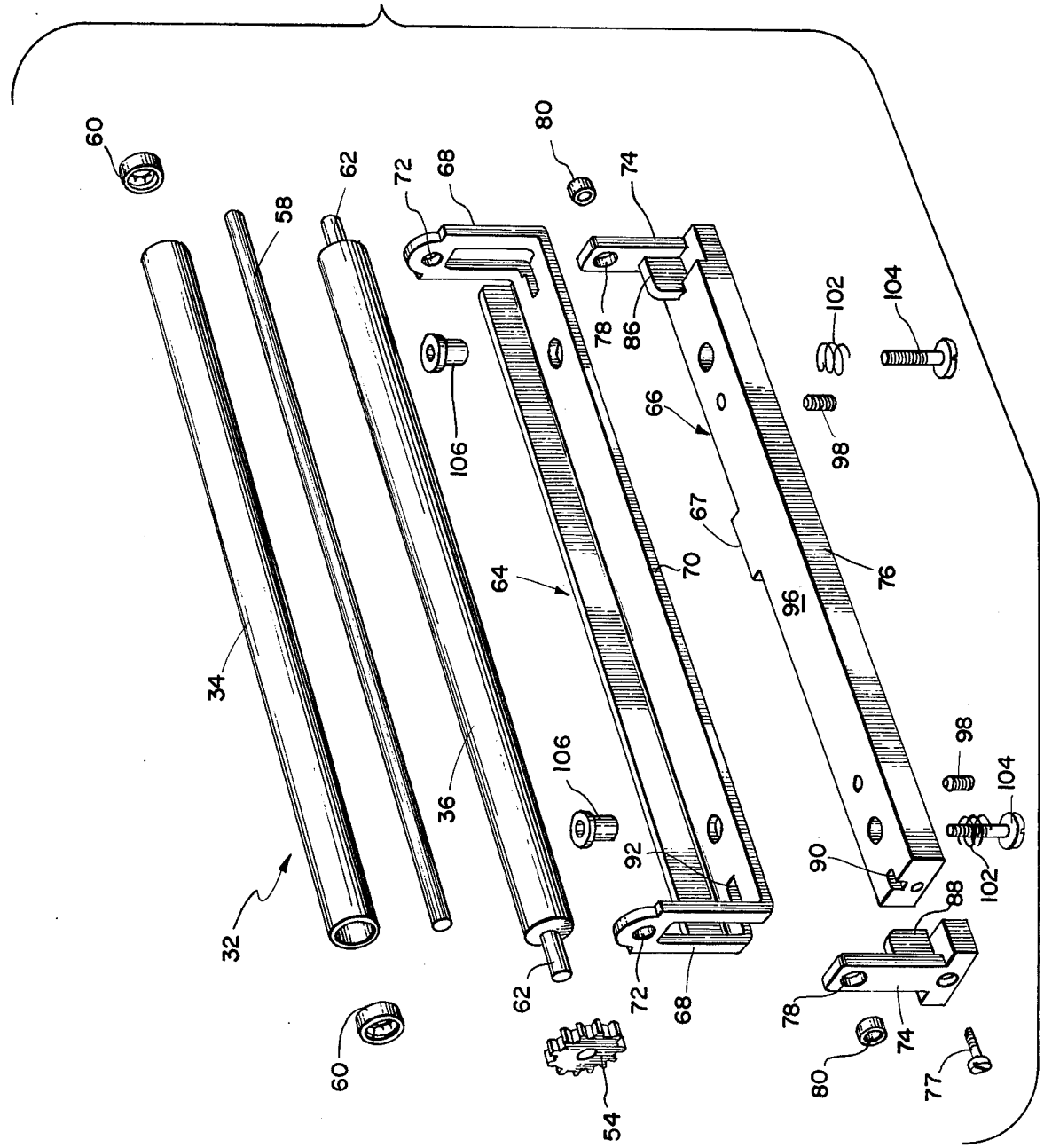

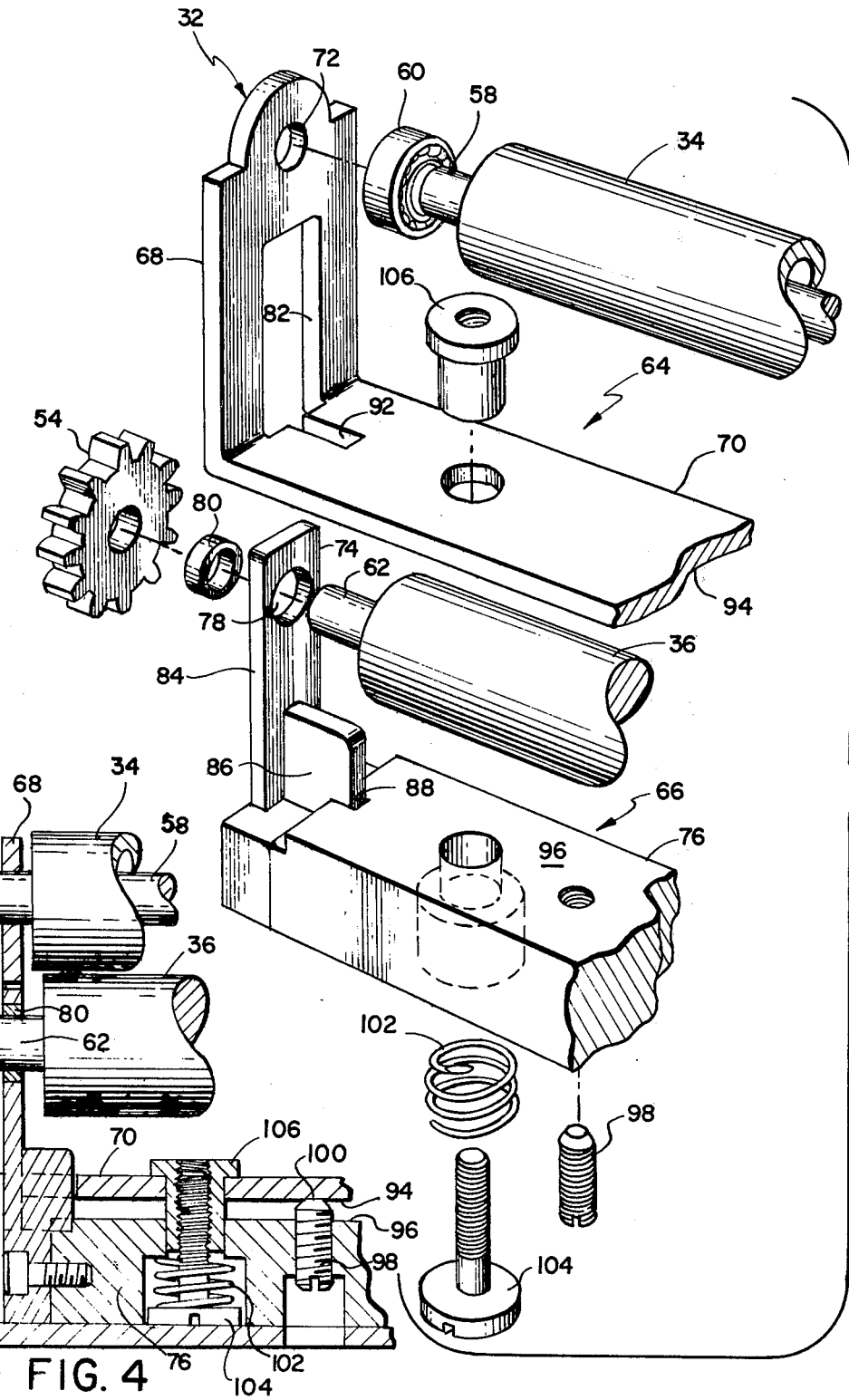

PROCESSING SYSTEM FOR PHOTOGRAPHIC APPARATUS

BACKGROUND OF THE INVENTION

1. Field of the Invention

This invention relates to photography and, more particularly, to improved apparatus for distributing processing fluid in a layer between a pair of superposed sheet materials.

2. Description of the Prior Art

In conventional photographic processes, film is exposed in a camera and later developed to produce a negative image. Positive prints are then produced in a darkroom by projecting light through this negative and exposing a second emulsion, e.g., a photosensitive printing paper, which then must be developed. However, in self-developing photographic films like those manufactured by Polaroid Corporation of Cambridge, Massachusetts, both a negative emulsion and a positive image-receiving layer are contained in a single assembly in the camera. In this instance, the exposed emulsion is developed and as a function of development, an imagewise distribution of diffusible image-forming components is formed and transferred to a superposed image-receiving layer. The development and diffusion transfer are effected by application of a predetermined amount of a viscous processing fluid to the photosensitive negative emulsion in a layer whose cross section is of predetermined configuration, as a negative emulsion is brought into superposed relationship with the image-receiving element. The diffusion transfer process is well known in the photographic art and is extensively described in the patent literature, as for example, in U.S. Pat. Nos. 2,543,181 and 3,415,644. In a typical film assembly, the processing fluid is stored in a pressure rupturable container sometimes referred to as a "pod"; such pods usually being attached to one of the photographic sheets of the film assembly.

The distribution of the processing fluid between the superposed sheets is facilitated by fluid processing apparatus which usually forms an integrated part of the camera system. Generally, this processing apparatus employs a pair of spreader elements which exert a compressive force on the film assembly, pod and photographic sheets, as it is advanced between them. The compressive force first ruptures the pod releasing the processing fluid therefrom and subsequently progressively spreads the released fluid in a uniformly distributed layer between the photographic sheets as further advancement occurs. The quality of the final image on the image-receiving element critically depends on the thickness of the processing fluid layer.

In general, the thickness of the processing fluid layer is a function of many variables, e.g., the magnitude of the compressive forces exerted by the spreader elements on the film assembly, the distance separating one spreader element from the other, the geometry and flexibility characteristics of the spreader elements, the viscosity of the processing fluid, the angle at which the film assembly enters and exits between the spreader elements, the physical characterisitcs of the photographic elements, and the speed at which the film assembly advances between the spreader elements. From the point of view of the fluid processing apparatus designer, the above-mentioned parameters may be divided into two broad categories; those over which he has control or independent, and those which act as design constraints or dependent. Which parameters are design controllable depends on how the film is advanced, i.e., by the user or by motorized means, and the stage of development of the final design of the film and other camera aspects. In this respect, experience indicates that the film and other camera aspects are usually developed to the extent that they, in fact, act as constraints. It is clear that the independent variables will be those not associated with film or other non-processor related camera features. Therefore, the aforementioned list of parameters which are independent are the compressive forces exerted by the spreader elements, the spacing between the spreader elements, the geometry and flexibility characteristics of the spreader elements, and the film assembly advancement speed, assuming this last is not manually controlled by the system user. It is evident then that every significantly different change in dependent variables, i.e., film or camera configuration changes, requires a new combination of independent variables which cooperate to produce a spread of processing fluid of predetermined thickness. Needless to say, the process of selecting the proper relationship of independent variables is time consuming, laborious and expensive. This is particularly so if asymmetric corrections are required where, for example, the film advancement means influences the way in which the film assembly leading edge enters between the spreader elements. And the selection process is generally repeated for each new film and camera type.

Since the self-developing systems manufactured by Polaroid Corporation of Cambridge, Massachusetts are generally directed for use by the mass amateur market, it is essential that costs be kept at an absolute minimum. This is not a simple task when one realizes that such systems must perform all the functions of a conventional camera, and additionally include a film processing capability. And because the film processing apparatus generally represents a significant part of the overall camera cost, it would be desirable to eliminate the costs associated with developing and manufacturing new processing systems each time a new film and camera is introduced into the market. This could be accomplished by providing a processing apparatus wherein the independent variables are adjustable or easily interchangeable, and one that can be easily inserted into and removed from those camera systems which contemplate the concept. The traditional laboratory development work would be substantially reduced since it would be replaced by a tuning process in the final hardware. Asymmetric conditions could be accommodated by differential adjustments. Along these same lines, piece part tolerances could be made more liberal and absorbed in a final assembly calibration of the processing apparatus thereby reducing costs.

The prior art recognizes the need for some flexibility through adjustment, but as will be seen, does not embrace the concept of a fully adjustable fluid processing apparatus for universal use, but rather it addresses itself to post-design performance considerations where certain independent parameters are controllably varied in response to ambient thermal conditions. For example, U.S. Pat. No. 3,369,473 describes an apparatus for varying the compressive forces as a function of the position of the spreader elements in the direction of advancement of the film assembly. U.S. Pat. No. 3,335,652 describes features similar to the previous patent and, in addition, includes means for manually adjusting the compressive forces, but the adjustment does not contemplate a differential force across the elongated dimension of the spreader element. U.S. Pat. Nos. 3,584,563; 3,589,262; and 3,604,329 are directed to post-design performance of the processing apparatus since they describe systems which become operative after the design has been fixed at some set point. Specifically, these systems have thermally responsive sensors which change either the speed of advancement of the film assembly through the spreader elements and/or the magnitude of the compressive forces as a function of the ambient temperature. These inventions thus maintain a uniform fluid layer by compensating for processing fluid viscosity variations with temperature.

It is obvious that the aforedescribed patented inventions contain limitations on their full adjustability. Therefore, a need still exists in the art for a fluid processing apparatus containing the full adjustment features. Such a system would approach the ultimate goal, i.e., a universal fluid processing apparatus adaptable to meet the varied needs of different camera-film systems, absolute minimum cost, and one that will not compromise the quality of the photograph furnished to the user.

An object of this invention, therefore, is to provide improved photographic apparatus for spreading a processing fluid as a layer between sheets of material, at least one of which contains a photosensitive layer.

An important object of this invention is to provide an apparatus of the type indicated which may be inserted into and removed from self-developing photographic systems.

Another object of this invention is to provide an apparatus of the type indicated which may be adjusted to suit the varied needs of different camera-film systems.

Yet another object of this invention is to provide an apparatus of the type indicated which would facilitate the reduction of development and manufacturing costs.

An additional object of this invention is to provide an apparatus of the type indicated which may reduce the piece part costs.

Other objects of the invention will in part be obvious and will in part appear hereinafter.

SUMMARY OF THE INVENTION

In its illustrated embodiments, the fluid processing apparatus of this invention is depicted as being employed in a camera for use with self-developing film. A pair of elongated spreader elements are rotatably mounted between spaced apart integral bearing and guide members which, in turn, are rigidly connected to a pair of support members having bases substantially parallel to the long axis of the spreader elements. The guides serve to direct translational motion of the spreader elements with respect to each other and to prevent any displacement lateral to the direction of translation. A pair of biasing springs are located adjacent opposite ends of the support member bases to resiliently urge the spreader elements toward one another. Cooperating with the support member bases and located adjacent opposite ends of said bases are a pair of manual means for uniformly or differentially adjusting the spacing separating the spreader elements and/or the magnitude of the forces caused by the pair of spring biasing means. The assembly is adapted to be inserted into and removed from a camera as an integral part thereof and is suitable for use in different self-developing photographic systems, particularly the type employing motors to drive the spreading apparatus and a film advancing assembly.

The invention accordingly comprises the apparatus possessing the construction, combination of elements and arrangement of parts which are exemplified in the following detailed disclosure and the scope of the application of which will be indicated in the claims.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description when read in connection with the accompanying drawings wherein like numbers have been employed in the different figures to denote the same parts and wherein:

FIG. 2 is an exploded diagrammatic perspective view of a fluid spreading apparatus employed in the camera illustrated in FIG. 1;

FIG. 3 is an exploded diagrammatic perspective view, with parts broken away, of the fluid spreading apparatus employed in the camera illustrated in FIG. 1;

FIG. 4 is a vertical section, with parts broken away, of the fluid processing apparatus of FIG. 2 illustrating the relationship of a pair of spreader elements and associated adjusting features;

DETAILED DESCRIPTION OF THE INVENTION

Figure 1:
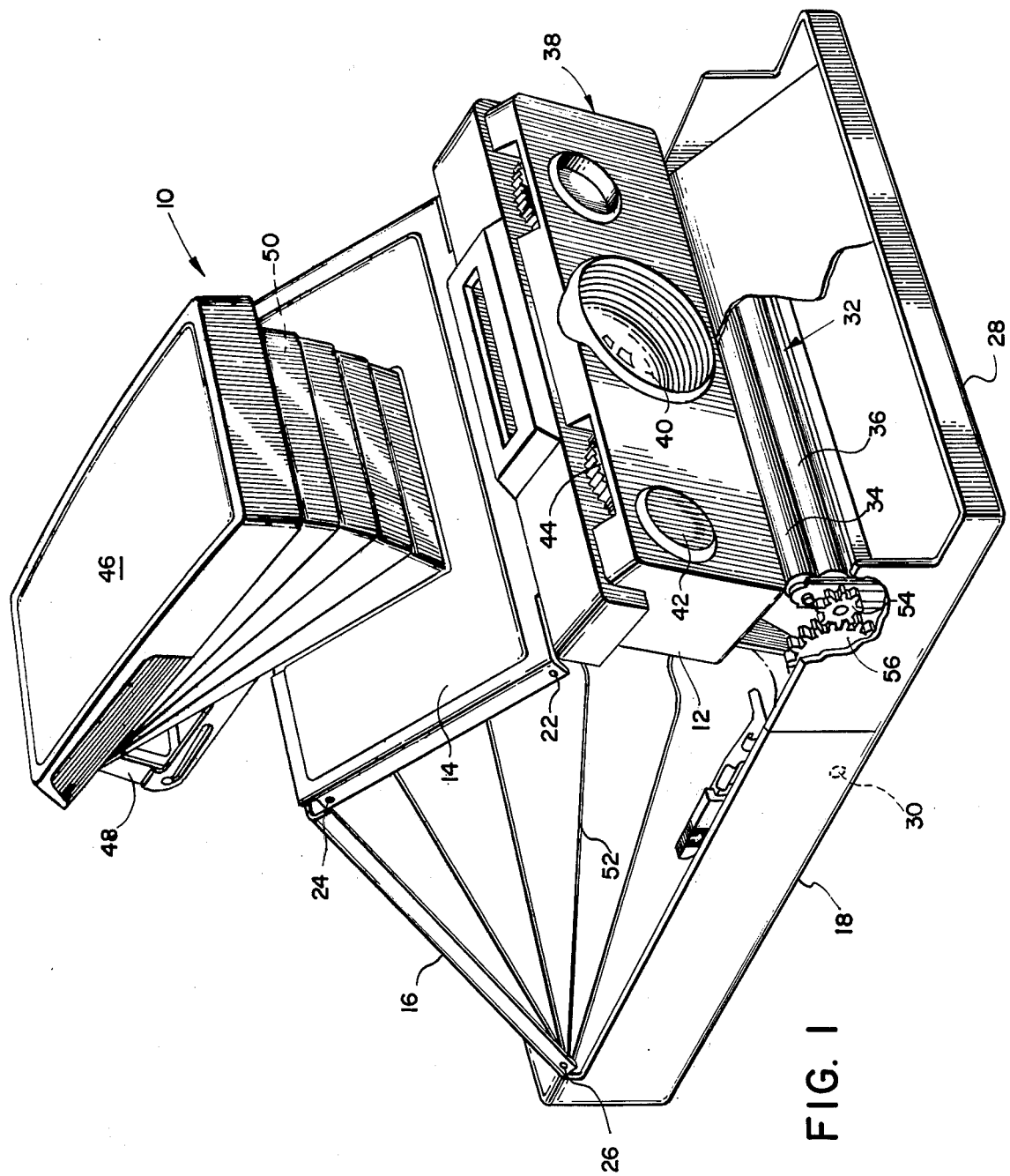
FIG. 1 is a diagrammatic perspective view of a camera embodying features of the invention.

In its illustrated embodiment, the present invention is depicted as being incorporated in a compact collapsible camera 10 for use with self-developing film. The camera 10 generally conforms to the camera structure disclosed and described in considerable detail in U.S. Pat. No. 3,714,879, entitled "Reflex Camera" by Edwin H. Land et al. The camera 10 is illustrated in its extended operative condition in FIG. 1. Referring now to FIG. 1, it will be seen that camera 10 includes a plurality of housing members 12, 14, 16 and 18 which are pivotally connected to one another at pivots 22, 24 and 26 for relative movement between the extended operative condition of FIG. 1 and a compact collapsed condition (not shown). Additionally, a housing member 28 extending in front of housing member 18 is pivotally connected thereto at pivot 30 for movement in a clockwise direction into a position wherein a film assemblage may be inserted into housing member 18. Housing member 28 includes means for mounting a fluid spreading assembly 32 including juxtaposed spreader elements 34 and 36 urged toward one another by resiliently biasing means. The present invention is particularly concerned with the nature of this fluid spreading assembly 32, which will be discussed in considerable detail hereinafter.

In its extended operative condition, camera 10 is first operated in a viewing and focusing mode and thereafter in an exposure and processing mode. By virtue of the single lens reflex characteristics of camera 10 and with the aid of a viewing device 46, the camera user selects and focuses the subject matter of his picture. As he looks through an eye lens 48 contained in viewing device 46, he sees an image of the subject matter formed in viewing chamber 50. Rotation of a focus wheel 44 causes a forward or rearward displacement of an objective lens 40 thereby permitting the user to adjust and set the sharpness of the subject matter image. To initiate the second mode of camera operation, i.e., exposure and processing, the user depresses an actuator button 42 contained in lens-shutter assembly 38.

Depression of actuator button 42 engages means (not shown) in camera 10 which effect a sequential series of camera system operations that ultimately result in a finished photograph. The first of these operations closes a normally open shutter located in assembly 38 thus producing an internally light-tight condition in an exposure chamber formed in part by bellows 52. At this time, an internal mirror (not shown) uncovers a photosensitive film unit and light rays coming from the focused subject matter are directed to the film unit instead of viewing chamber 50. After a predetermined time, the shutter reopens and the exposure is made. After an appropiate exposure interval, the shutter again closes and the exposure chamber is again in a light-tight condition. At this time, the internal mirror (not shown) is repositioned to its original state covering the exposed film unit. After the mirror is returned to its initial state, means in camera 10, not shown, but comprised of a suitable motor and film advance mechanism, advance the exposed film unit into position between spreader elements 34 and 36. In this connection, spreader element 36 constitutes a drive element in that it has a spur gear 54 axially connected thereto which in turn is connected to the camera's motor (not shown) through an appropriate gear train, not shown in its entirety but comprising a pinion 56. When the exposed film unit enters into a position between spreader elements 34 and 36, the drive element 36 then serves to progressively advance the film unit through the fluid spreader assembly 32 and thence from the camera 10. The shutter then reopens and camera 10 returns to its viewing and focusing mode.

As indicated, the present invention is particularly directed to certain aspects of the camera's fluid spreading assembly 32, the nature of which may best be understood by referring to FIG. 2 of the drawings. As shown therein, assembly 32 comprises a pair of elongated spreader elements 34 and 36, said spreader elements preferably being a pair of rollers and hereinafter referred to as such. The roller 34 is hollow and therefore of relatively low weight and inertia. It is rotatably mounted on a shaft 58 by a pair of ball bearing assemblies 60. The roller 36 is solid having a pair of extensions 62 which serve as journals. Rollers 34 and 36 are mounted in juxtaposition by means of a pair of mounting members 64 and 66. Member 64 is made from a unitary piece of sheet metal such as stainless or carbon steel. It includes a pair of spaced support members 68 rigidly connected to a base 70 such that the support members 68 are perpendicular thereto. Each support member 68 has portions defining a hole 72 wherein the respective ends of shaft 58 are placed. Roller 34 is rotatably mounted between spaced apart support members 68 such that the elongated dimension of roller 34 is aligned substantially parallel with base 70 of mounting member 64. Referring now to mounting member 66, it also includes a pair of spaced apart support members 74 fastened to a base 76 by suitable connecting means 77 such that the support members are perpendicular thereto. Each support member 74 has portions defining a hole 78 wherein is placed a bushing 80 for rotatably mounting the journals 62 of roller 36. Roller 36 is rotatably mounted between spaced apart support members 74 such that the elongated dimension of roller 36 is substantially parallel with base 76 of mounting member 66. After assembling roller 36 into mounting member 66, spur gear 54 is axially attached to the appropriate journaled extension 62 of roller 36 so that roller 36 may perform its driving function thus facilitating fluid spreading and film advancement through spreader assembly 32.

Additional features of the invention relating to the relative motion of roller 34 with respect to roller 36 will be seen by now referring to FIG. 3. In this respect, each support member 68 includes a recessed vertical slot 82 which slidably mates with an extended vertical tab 84 of support members 74 as mounting member 64 is superimposed on mounting member 66. It can be seen that the geometry of vertical slots 82 and vertical tabs 84 is complementary and thus serves to position roller 34 above roller 36 in a vertical plane. Therefore relative displacement between roller 34 and roller 36 is constrained to occur in this plane. It should be noted and will hereinafter be further elaborated on, that the aforementioned feature of the invention permits linear relative displacement to occur between the ends of rollers 34 and 36 which may be different.

Directing attention now to additional guiding and alignment characteristics of the invention, it can be seen by further reference to FIG. 3 that each of the support members 74 also include a shorter vertically extended tab 86 oriented perpendicular to tab 84. Tabs 86 in cooperation with features of bases 70 and 76 have dual functions. First, a root portion 88 of each tab 86 mates with a keyway 90 in base 76 when each support member 74 is fastened to base 76. This keying obviously facilitates proper alignment of the various elements in the assembly. Second, the upper portion of each of the tabs 86 slidably engages a slot 92 in opposite ends of base 70 thus preventing any relative axial motion between rollers 34 and 36, and it further aids in directing the relative linear motion of roller 34 with respect to roller 36 in the vertical plane described hereinabove.

Attention is directed now to FIG. 4 which illustrates the relative positions of the various elements of the fluid spreading assembly 32 and shows in detail the adjustment features of the instant invention. After mounting member 64 is superimposed on mounting member 66 a bottom surface 94 of base 70 and a top surface 96 of base 76 are contiguous. As can be seen, appropriate rotation of a pair of adjustment screws 98 in base 76 causes their tops 100 to advance until they bear against surface 94 causing bases 70 and 76 to separate as further rotation occurs.

Because roller 34 is connected to mounting member 64 and roller 36 to mounting member 66, the rollers like-wise separate with rotation of screws 98. Therefore, screws 98 function as a means for adjusting the spacing between rollers 34 and 36. Means for resiliently biasing roller 34 toward roller 36 is provided for by resiliently connecting base 70 to base 76 by use of a pair of adjusting assemblies located near opposite ends of the fluid spreading assembly 32. Each adjusting assembly includes a spring 102, a screw 104 and a flanged cylindrical nut 106. It is evident that rotation of either screw 104 results in a compression or relaxation of its associated spring 102. Therefore, each screw 104 provides a means for adjusting the magnitude of the force resiliently biasing roller 34 toward roller 36.

The inherent beneficial advantages derived from the flexibility of choosing the values and relationships of the independent design variables were discussed in detail heretofore. In view of the problems and solution choices encountered in the design and manufacturing processes, it can now be more fully appreciated how the two-sided dual adjustment features characteristics of this invention enhance the selection process and promote a rapid design solution. By virtue of the two-sided adjustments, the spacing separating the spreader elements and/or the magnitude of the force caused by the resiliently urging means can be set differentially or uniformly across the elongated spreader element dimension. Since the assembly in other respects is complete and contemplates a camera capable of accepting it, the final selection of independent variables, e.g. spring tension and spreader element spacing, and final design are coincident. Manufacturing controls can be implemented by suitable automatic means for setting the final values of the independent variable.

Figure 5:
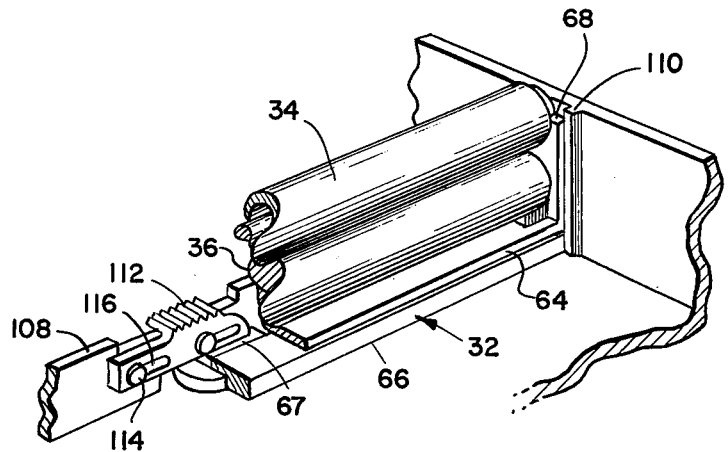
FIG. 5 is a fragmentary perspective view, with parts broken away, of the fluid spreading apparatus employed in the camera of FIG. 1 illustrating means for releasably detaching the spreading apparatus from the camera.

FIG. 5 illustrates a releasable latching means for connecting the fluid spreader assembly 32 to the camera 10. Housing member 28 includes a nest formed by longitudinal rib 108 and vertical guides 110, only one of which is shown. The latching means includes a latch 112 having a slot 116. The latch 112 is slidably mounted to the longitudinal rib 108 by a pair of flanged pins 114. Latch 112 can be moved to one of two extreme positions, i.e., the latched and unlatched position. When latch 112 is in its unlatched position, fluid spreading assembly 32 can be either inserted into or removed from the nest of housing member 28. After insertion, assembly 32 is locked into position when latch 112 is moved into its latched position. In the latched position, latch 112 is positioned above and in contact with extended tab 67 which is rigidly attached to base 76 by suitable fastening means. Thus assembly 32 is captured in position and prevented from moving. This relatively simple mounting means, if incorporated in cameras anticipating the availability of assembly 32, would unify the concept of a universal fluid spreading system.

Figure 6:
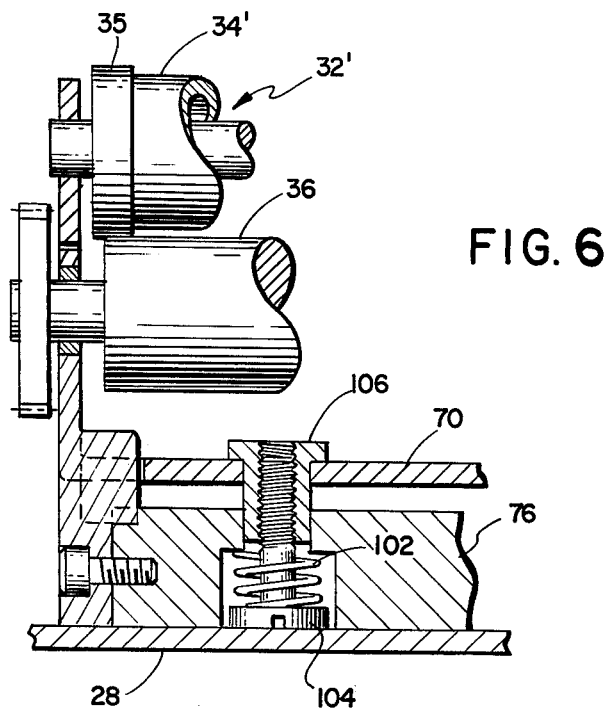
FIG. 6 is a view similar to FIG. 4 illustrating a different embodiment of the fluid spreading apparatus of the invention.

FIG. 6 shows an embodiment of assembly 32 without the means for manually adjusting the spacing between rollers 34 and 36. This embodiment shows a fluid spreading assembly 32' wherein a roller 34' is provided with a pair of annular collars 35 (only one being shown) against which the roller 36 is initially seated under the force of spring 102. As shown, these collars 35 determine a controlled minimum spacing between rollers 34' and 36 which facilitates the initial introduction of the film unit therebetween.

Those familiar with the photographic arts will readily appreciate the novel and unique advantages inherent in this invention. Most importantly, a minimum cost universal fluid processing apparatus adaptable to meet the varied needs of different camera-film systems has been provided.

This invention may be practiced or embodied in still other ways without departing from the spirit or essential character thereof. The embodiments described herein are therefore illustrative and not restrictive, the scope of the invention being indicated by the appended claims and all variations which come within the meaning of the claims are intended to be embraced therein.

What is claimed is:

1. Photographic apparatus, including means for spreading a processing fluid between a pair of sheet materials comprising:

a pair of elongated spreader elements;

means for mounting said spreader elements in juxtaposition, said mounting means being structured to facilitate the displacement of said spreader elements away from each other, and wherein said mounting means include a pair of support members each of which includes means for rotatably mounting at least one of said spreader elements therebetween and means for linearly guiding the movement of said spreader elements relative to each other; and manually operable means for adjusting the spacing between said spreader elements, said manually operable means cooperatively acting with said linearly guiding means to facilitate adjustment of the spacing between said spreader elements.

2. The apparatus of claim 1 additionally comprising means for resiliently urging one of said spreader elements toward the other spreader element during the passage of the pair of sheet materials therebetween.

3. The apparatus of claim 1 wherein said mounting means includes a base positioned so that said pair of support members are perpendicular thereto.

4. The apparatus in claim 3 wherein said manually operable means includes a pair of adjustments each located adjacent opposite ends of said mounting means base cooperatively acting with said base to facilitate relative displacement of said spreader elements with respect to each other so that the spacing between said spreader elements can be differentially adjusted across their elongated dimension.

5. The apparatus of claim 4 additionally comprising means for resiliently urging one of said spreader elements toward the other spreader element during passage of the pair of sheet materials therebetween.

6. The apparatus of claim 1 additionally comprising means for releasably detaching said spreading means from said photographic apparatus.

7. Photographic apparatus, including means for spreading a processing fluid between a pair of sheet materials comprising:

a pair of elongated spreader elements;

means for mounting said spreader elements in juxtaposition, said mounting means being structured to facilitate the displacement of said spreader elements away from each other, and wherein said mounting means include a pair of support members each of which includes means for rotatably mounting at least one of said spreader elements therebetween and means for linearly guiding the movement of said spreader elements relative to each other;

biasing means for resiliently urging one of said spreader elements toward the other spreader element during passage of the pair of sheet materials therebetween, said biasing means positioned adjacent opposite ends of said spreader elements elongated dimension; and means for manually adjusting said biasing means, said adjusting means positioned adjacent opposite ends of said spreader elements elongated dimension so that the resiliently urging force caused by said biasing means can be differentially adjusted across the elongated dimension of said spreader elements, said manually adjusting means cooperatively acting with said linearly guiding means to facilitate adjustment of biasing forces created thereby.

8. The apparatus of claim 7 wherein said mounting means includes a base positioned so that said pair of support members are perpendicular thereto.

9. The apparatus of claim 8 wherein said means for manually adjusting said biasing means includes a pair of adjustments each positioned adjacent opposite ends of said mounting means base cooperatively acting with said base to facilitate differential adjustment of the resiliently urging force caused by said biasing means.

10. The apparatus of claim 9 additionally comprising means for establishing a predetermined minimum spacing between said spreader elements.

11. The apparatus of claim 7 additionally comprising means for releasably detaching said spreading means from said photographic apparatus.

12. Photographic apparatus, including means for spreading a processing fluid between a pair of sheet materials, comprising:

a pair of elongated spreader elements;

means for mounting said spreader elements in juxtaposition, said mounting means being structured to facilitate the displacement of said spreader elements away from each other, and wherein said mounting means include a pair of support members each of which includes means for rotatably mounting at least one of said spreader elements therebetween and means for linearly guiding the movement of said spreader elements relative to each other;

first means for manually adjusting the spacing between said spreader elements, said first adjusting means cooperatively acting with said linearly guiding means to facilitate adjustment of the spacing between said spreader elements;

biasing means for resiliently urging one of said spreader elements toward the other spreader element during the passage of the pair of sheet elements therebetween; and second means for manually adjusting said biasing means.

13. The apparatus of claim 12 wherein said mounting means includes a base positioned so that said pair of support members are perpendicular thereto.

14. The apparatus of claim 13 wherein said first adjustment means includes a pair of adjustments each located adjacent opposite ends of said mounting means base cooperatively acting with said base to facilitate relative displacement of spreader elements with respect to each other so that the spacing between said spreader elements can be differentially adjusted across their elongated dimension.

15. The apparatus of claim 13 wherein said second adjusting means includes a pair of adjustments each positioned adjacent opposite ends of said mounting means base cooperatively acting with said base to facilitate differential adjustment of the resiliently urging force caused by said biasing means.

16. The apparatus of claim 12 additionally comprising means for releasably detaching said spreading means from said photographic apparatus.

17. Photographic apparatus, including means for spreading a processing fluid between a pair of sheet materials, comprising:

a pair of elongated spreader elements;

means for mounting said spreader elements in juxtaposition, said mounting means being structured to facilitate the displacement of said spreader elements away from each other;

manually operable means for adjusting the spacing between said spreader elements;

means for resiliently urging one of said spreader elements toward the other spreader element during passage of the pair of sheet materials therebetween; and latch means for readily detaching said spreading means from said photographic apparatus.

18. Photographic apparatus, including means for spreading a processing fluid between a pair of sheet materials comprising:

a pair of elongated spreader elements;

means for mounting said spreader elements in juxtaposition, said mounting means being structured to facilitate the displacement of said spreader elements away from each other;

biasing means for resiliently urging one of said spreader elements toward the other spreader element during passage of the pair of sheet materials therebetween, said biasing means positioned adjacent opposite ends of said spreader elements elongated dimension;

means for manually adjusting said biasing means, said adjusting means positioned adjacent opposite ends of said spreader elements elongated dimension so that the resiliently urging force caused by said biasing means can be differentially adjusted across the elongated dimension of said spreader elements; and latch means for readily detaching said spreading means from said photographic apparatus.

19. Photographic apparatus, including means for spreading a processing fluid between a pair of sheet materials comprising:

a pair of elongated spreader elements;

means for mounting said spreader elements in juxtaposition, said mounting means being structured to facilitate the displacement of said spreader elements away from each other;

first means for manually adjusting the spacing between said spreader elements;

biasing means for resiliently urging one of said spreader elements toward the other spreader element during passage of the pair of sheet materials therebetween;

second means for manually adjusting said biasing means; and latch means for readily detaching said spreading means from said photographic apparatus.

* * * * *